(12) United States Patent
Ellul et al.

(10) Patent No.: US 8,846,815 B2
(45) Date of Patent: Sep. 30, 2014

(54) PEROXIDE-CURED THERMOPLASTIC VULCANIZATES PREPARED WITH ULTRAHIGH MOLECULAR WEIGHT PLASTICS

(75) Inventors: Maria Dolores Ellul, Silver Lake Village, OH (US); Eugene Ronald Uhl, Massillon, OH (US); Patrick Brant, Seabrook, TX (US); Jeffrey Lawrence Brinen, League City, TX (US); Zerong Lin, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 601 days.

(21) Appl. No.: 12/163,349

(22) Filed: Jun. 27, 2008

(65) Prior Publication Data

US 2009/0043048 A1 Feb. 12, 2009

Related U.S. Application Data

(60) Provisional application No. 60/954,196, filed on Aug. 6, 2007.

(51) Int. Cl.
*C08L 23/10* (2006.01)
*C08L 23/16* (2006.01)
*C08L 91/00* (2006.01)

(52) U.S. Cl.
CPC ............. *C08L 23/16* (2013.01); *C08L 23/10* (2013.01); *C08L 91/00* (2013.01); *C08L 2312/00* (2013.01)
USPC ............................ 525/240; 525/191; 526/351

(58) Field of Classification Search
CPC ...................................... C08L 23/16
USPC ........................... 525/240, 191; 526/351, 352
See application file for complete search history.

(56) References Cited

U.S. PATENT DOCUMENTS

| 4,536,536 | A | * | 8/1985 | Kavesh et al. | 524/462 |
|---|---|---|---|---|---|
| 4,972,035 | A | * | 11/1990 | Suga et al. | 526/125.6 |
| 4,985,502 | A | | 1/1991 | Izumi et al. | 525/194 |
| 5,430,119 | A | * | 7/1995 | Kouya et al. | 526/348.1 |
| 5,656,693 | A | | 8/1997 | Ellul et al. | 525/171 |
| 6,160,072 | A | * | 12/2000 | Ewen | 526/351 |
| 6,300,396 | B1 | * | 10/2001 | Tsunoda et al. | 524/232 |
| 6,329,476 | B1 | * | 12/2001 | Martin et al. | 526/64 |
| 6,350,828 | B1 | * | 2/2002 | Takaoka et al. | 526/125.3 |
| 6,706,385 | B1 | * | 3/2004 | Karaiwa | 428/323 |
| 6,759,475 | B2 | * | 7/2004 | Sakai et al. | 524/515 |
| 6,939,918 | B2 | | 9/2005 | Ellul et al. | 525/191 |
| 2007/0043172 | A1 | * | 2/2007 | Ellul et al. | 525/192 |

FOREIGN PATENT DOCUMENTS

| EP | 0472956 | 3/1992 | C08L 23/12 |
|---|---|---|---|
| EP | 1063084 | 12/2000 | B32B 27/32 |
| JP | 11092603 | 6/1999 | C08L 23/16 |
| JP | 2004070592 | 3/2007 | C08J 3/24 |
| JP | 2007070592 | 3/2007 | |
| WO | WO2005/028555 | 3/2005 | C08L 23/16 |
| WO | WO2007/022908 | 3/2007 | |

* cited by examiner

*Primary Examiner* — Irina Krylova

(57) ABSTRACT

A thermoplastic vulcanizate comprising a dynamically cured rubber, where the rubber is peroxide cured, and a thermoplastic phase, where at least 10% by weight of the thermoplastic phase includes an ultrahigh molecular weight plastic, where the ultrahigh molecular weight plastic is characterized by a $M_w$ that is greater than $0.8 \times 10^6$ g/mole.

10 Claims, No Drawings

PEROXIDE-CURED THERMOPLASTIC VULCANIZATES PREPARED WITH ULTRAHIGH MOLECULAR WEIGHT PLASTICS

CROSS REFERENCE TO RELATED APPLICATION

This application claims priority to U.S. Provisional Patent Application No. 60/954,196 filed Aug. 6, 2007, the disclosures of which are incorporated herein by reference in its entirety.

FIELD OF THE INVENTION

One or more embodiments of the present invention relate to thermoplastic vulcanizates prepared with ultrahigh molecular weight plastics.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic matrix. These rubber particles are crosslinked to promote elasticity.

In many instances, elastomeric olefinic copolymers (e.g., ethylene-propylene-diene terpolymers) are employed as the rubber component of thermoplastic vulcanizates. For example, U.S. Pat. No. 6,939,918 discloses the manufacture of thermoplastic vulcanizates by employing terpolymers of ethylene, propylene, and diene monomer such as 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene, and divinyl benzene. This rubber can be dynamically cured by using any curative capable of crosslinking the elastomeric copolymer including phenolic resins, peroxides, maleimides, and silicon-based curatives.

Thermoplastic vulcanizates that are dynamically vulcanized with peroxide cure systems advantageously are non-hygroscopic, halide-free, lighter in color, thermally stable, and contain less residues. One shortcoming associated with the use of a peroxide cure system is the deleterious impact on the thermoplastic polymers within the thermoplastic vulcanizates. Namely, the peroxide curatives are believed to degrade the thermoplastics (e.g., polypropylene) via chain scission. As a result, thermoplastic vulcanizates that are fully cured by peroxide cure systems may typically be characterized by lower ultimate tensile strength, lower elongation at break, and lower melt strength.

The prior art has attempted to overcome these shortcomings. For example, U.S. Pat. No. 4,985,502 teaches the use of less peroxide curative. Unfortunately, however, the use of a limited amount of peroxide precludes the ability to fully cure the rubber and engineering properties are sacrificed.

Also, U.S. Pat. No. 5,656,693 attempts to alleviate the problem of polypropylene degradation, and yet achieve a full cure of the rubber, by employing a rubber terpolymer that includes vinyl norbornene as a polymeric unit. These rubbers are more efficiently curable with peroxides and therefore the amount of peroxide required to achieve a full cure is reduced, which thereby reduces the impact on the polypropylene.

Inasmuch as the use of peroxide cure systems to dynamically cure—and ideally fully cure—the rubber phase of thermoplastic vulcanizates may offer many advantages, there remains a desire to improve upon the ability to employ a peroxide cure system in the manufacture of thermoplastic vulcanizates.

SUMMARY OF THE INVENTION

One or embodiments of the present invention provide a thermoplastic vulcanizate comprising a dynamically cured rubber, where the rubber is peroxide cured, and a thermoplastic phase, where at least 10% by weight of the thermoplastic phase includes an ultrahigh molecular weight plastic, where the ultrahigh molecular weight plastic is characterized by a $M_w$ that is greater than $0.8 \times 10^6$ g/mole.

One or more embodiments of the present invention also provides a method of making a thermoplastic vulcanizate, the method comprising introducing a rubber and a thermoplastic resin to form a mixture, dynamically vulcanizing the rubber with a peroxide curative in the presence of the thermoplastic resin to form a thermoplastic vulcanizate, where said step of dynamically vulcanizing the rubber causes the thermoplastic resin to become a continuous phase of the thermoplastic vulcanizate, optionally introducing an additional thermoplastic resin to the thermoplastic vulcanizate after said step of dynamically vulcanizing the rubber, where at least one of (i) the thermoplastic resin introduced with the rubber and (ii) the additional thermoplastic resin introduced with the thermoplastic vulcanizate is an ultrahigh molecular weight plastic characterized by an $M_w$ that is greater than $0.8 \times 10^6$ g/mole and an $M_n$ that is greater than $0.2 \times 10^6$ g/mole.

DETAILED DESCRIPTION OF ILLUSTRATIVE EMBODIMENTS

The thermoplastic vulcanizates of one or more embodiments of the present invention include a peroxide-cured rubber phase and a thermoplastic phase including an ultrahigh molecular weight plastic. In these or other embodiments, the thermoplastic vulcanizates are prepared by dynamically vulcanizing a rubber with a peroxide curative in the presence of an ultrahigh molecular weight plastic. In other embodiments, thermoplastic vulcanizates are prepared by dynamically vulcanizing a rubber with a peroxide curative in the presence of a plastic, such as a plastic conventionally employed in the art, and subsequently introducing an ultrahigh molecular weight plastic to thermoplastic vulcanizate.

Rubber Phase

The rubbers that may be employed to form the rubber phase include those polymers that are capable of being cured or crosslinked by a peroxide cure system. Reference to a rubber may include mixtures of more than one rubber. Non-limiting examples of rubbers include olefinic elastomeric copolymers, and mixtures thereof. In one or more embodiments, olefinic elastomeric copolymers include ethylene-propylene-non-conjugated diene rubbers or propylene-based rubbery copolymers containing units derived from non-conjugated diene monomers.

Ethylene-Propylene Rubber

The term ethylene-propylene rubber refers to rubbery copolymers polymerized from ethylene, at least one α-olefin monomer, and at least one diene monomer. The α-olefins may include, but are not limited to, propylene, 1-butene, 1-hexene, 4-methyl-1-pentene, 1-octene, 1-decene, or combinations thereof In one embodiment, the α-olefins include propylene, 1-hexene, 1-octene or combinations thereof The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof Copolymers prepared from ethylene, α-olefin, and diene monomers may be referred to as a terpolymer or even a tetrapolymer in the event that multiple α-olefins or dienes are used.

In one or more embodiments, the ethylene-propylene rubber includes from about 12 to about 85% by weight, or from about 20 to about 80% by weight, or from about 40 to about 70% by weight, or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units deriving from α-olefin monomer (e.g., $C_3$-$C_{10}$ olefins such as propylene). Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-ethylidene-2-norbornene. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-ethylidene-2-norbornene. In one or more embodiments, where the diene includes 5-vinyl-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11 % by weight units deriving from 5-vinyl-2-norbornene.

In one or more embodiments, ethylene-propylene rubber may have a weight average molecular weight ($M_w$) that is greater than 100,000 g/mole, in other embodiments greater than 200,000 g/mole, in other embodiments greater than 400,000 g/mole, and in other embodiments greater than 600,000 g/mole; in these or other embodiments, the Mw of the preferred ethylene-propylene rubber is less than 1,200,000 g/mole, in other embodiments less than 1,000,000 g/mole, in other embodiments less than 900,000 g/mole, and in other embodiments less than 800,000 g/mole. In one or more embodiments, useful ethylene-propylene rubbers have a number average molecular weight ($M_n$) that is greater than 20,000 g/mole, in other embodiments greater than 60,000 g/mole, in other embodiments greater than 100,000 g/mole, and in other embodiments greater than 150,000 g/mole; in these or other embodiments, the $M_n$ of the ethylene-propylene rubbers of one or more embodiments is less than 500,000 g/mole, in other embodiments less than 400,000 g/mole, in other embodiments less than 300,000 g/mole, and in other embodiments less than 250,000 g/mole. Techniques for determining the molecular weight ($M_n$, $M_w$ and $M_z$) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practices, and references cited therein.

In one or more embodiments, ethylene-propylene rubber may also be characterized by having a Mooney viscosity ($ML_{(1+4)}$ at 125° C.) per ASTM D-1646, of from about 10 to about 500 or from about 50 to about 450.

In one or more embodiments, ethylene-propylene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g.

In one or more embodiments, the ethylene-propylene rubber may be characterized by a glass transition temperature ($T_g$), as determined by Differential Scanning Calorimetry (DSC) according to ASTM E-1356, that is less than −20° C., in other embodiments less than −30° C., in other embodiments less than −50° C., and in other embodiments from about −20 to about −60° C.

Ethylene-propylene rubber may be manufactured or synthesized by using a variety of techniques. For example, these copolymers can be synthesized by employing solution, slurry, or gas phase polymerization techniques that employ various catalyst systems including Ziegler-Natta systems including vanadium catalysts and take place in various phases such as solution, slurry, or gas phase. Exemplary catalysts include single-site catalysts including constrained geometry catalysts involving Group IV-VI metallocenes. Elastomeric copolymers are commercially available under the tradenames Vistalon™ (ExxonMobil Chemical Co.; Houston, Tex.), Keltan™ (DSM Copolymers), Nordel™ IP (Dow), NORDEL MG™ (Dow), Royalene™ (Chemtura) and Buna™ (Lanxess).

Propylene-Based Rubbery Copolymer

In one or more embodiments, the propylene-based rubbery copolymer, which may also be referred to as propylene-α-olefin copolymers or propylene-based elastomers, include units (i.e., mer units) derived from propylene, one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5% by weight, in other embodiments at least 6% by weight, in other embodiments at least 8% by weight, and in other embodiments at least 10% by weight ethylene-derived units; in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived, α-olefin derived units, and diene-derived units. Stated another way, the propylene-based rubbery copolymers may include at least 60% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived and ethylene-derived mer units.

In one or more embodiments, the propylene-based rubbery copolymers may include at least 0.5% by weight, in other embodiments at least 1.5% by weight, and in other embodiments at least 3% by weight diene-derived units; in these or other embodiments, the propylene-based rubbery copolymers may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the $T_m$ of the propylene-based rubbery copolymer is less than 110° C., in other embodiments less than 90° C., in other embodiments less than 80° C., and in other embodiments less than 70° C.; in these or other embodiments, the propylene-based rubbery copolymer has a $T_m$ of at least 25° C., in other embodiments at least of 35° C., in other embodiments at least of 40° C., and in other embodiments at least of 45° C. In particular embodiments, the propylene-based rubbery copolymer exhibits no melting point.

In one or more embodiments, the propylene-based rubbery copolymer may be characterized by a heat of fusion (Hf), as determined according to DSC procedures according to ASTM E-793. This may be determined by placing 6 to 10 mg of sample into DSC equipment and heating the sample at about 10° C./min. In one or more embodiments, the propylene-based rubbery copolymer may be characterized by a heat of fusion of about 0 J/g, in other embodiments at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-based rubbery copolymer may be characterized by a heat of fusion that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-based rubbery copolymer can have a triad tacticity of propylene units, as measured by $^{13}C$ NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the propylene-based rubbery copolymer may have a % crystallinity of from 0.5% to 40%, in other embodiments 1% to 30%, and in other embodiments 5% to 25%. Crystallinity may be determined according to DSC procedures in accordance with ASTM E-794-95. This may be determined by placing 6 to 10 mg of sample into DSC equipment and heating the sample at about 10° C./min. For use herein, the crystallinity of the propylene-ethylene polymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%. In particular embodiments, the propylene-based rubbery copolymer has a crystallinity of 0%.

In one or more embodiments, the propylene-based rubbery copolymer can have a density of about 0.85 g/cm$^3$ to about 0.92 g/cm$^3$, in other embodiments about 0.87 g/cm$^3$ to 0.90 g/cm$^3$, and in other embodiments from about 0.88 g/cm$^3$ to about 0.89 g/cm$^3$ at room temperature as measured per the ASTM D-792 test method.

In one or more embodiments, the propylene-based rubbery copolymer can have an melt index (MI) (ASTM D-1238, 2.16 kg @ 190° C.), of less than 10 dg/min, in other embodiments ≤6.5 dg/min, in other embodiments ≤6 dg/min, in other embodiments ≤5.5 dg/min, and in other embodiments ≤5 dg/min.

In one or more embodiments, the propylene-based rubbery copolymer can have a melt flow rate (MFR), as measured according to the ASTM D-1238, 2.16 kg weight @ 230° C., equal to or greater than 0.2 dg/min, in other embodiments of at least 0.2 dg/min, in other embodiments at least 0.5 dg/min, and in other embodiments at least 1.0 dg/min. In these or other embodiments, the melt flow rate may be equal to or less than 350 dg/min, and in other embodiments less than 100 dg/min. In an embodiment, the propylene-based polymer has MFR of 0.5 dg/min to 350 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

In one or more embodiments, the propylene-based rubbery copolymers may have a Mooney viscosity [ML (1+4) @ 125° C.], as determined according to ASTM D-1646, of less than 100, in other embodiments less than 75, in other embodiments less than 60, and in other embodiments less than 30.

In one or more embodiments, the propylene-based rubbery copolymer can have a $M_w$ of about 5,000 to about 5,000,000 g/mole, in other embodiments a $M_w$ of about 10,000 to about 1,000,000 g/mole, in other embodiments a $M_w$ of about 20,000 to about 500,000, g/mole and in other embodiments a $M_w$ of about 50,000 to about 400,000 g/mole.

In one or more embodiments, the propylene-based rubbery copolymer can have a $M_n$ of about 2,500 to about 2,500,000 g/mole, in other embodiments a $M_n$ of about 5,000 to about 500,000 g/mole, in other embodiments a $M_n$ of about 10,000 to about 250,000 g/mole, and in other embodiments a $M_n$ of about 25,000 to about 200,000 g/mole.

In one or more embodiments, the propylene-based rubbery copolymer can have a Z-average molecular weight ($M_z$) of about 10,000 to about 7,000,000 g/mole, in other embodiments a $M_z$ of about 50,000 to about 1,000,000 g/mole, in other embodiments a $M_z$ of about 80,000 to about 700,000 g/mole, and in other embodiments a $M_z$ of about 100,000 to about 500,000 g/mole.

In one or more embodiments, the molecular weight distribution index (MWD=($M_w/M_n$)) of the propylene-based rubbery copolymer may be about 1 to about 40, in other embodiments about 1 to about 5, in other embodiments about 1.8 to about 5, and in other embodiments about 1.8 to about 3.

Ultrahigh Molecular Weight Plastic

The ultrahigh molecular weight plastics of one or more embodiments of the present invention include greater than about 90 mole % propylene mer units (i.e., polymeric units deriving from the polymerization of propylene monomer), in other embodiments greater that about 95 mole % propylene mer units, and in other embodiments greater than about 99.99 mole % propylene mer units.

The ultrahigh molecular weight plastics of one or more embodiments of the present invention may be characterized by an intrinsic viscosity that is greater than about 11 dl/g, and in other embodiments greater than about 12 dl/g. The intrinsic viscosity of the ultrahigh molecular weight plastic may be determined by the standard procedure outlined in "PREPARATIVE METHODS OF POLYMER CHEMISTRY", written by W. R. Sorenson and T. W. Campbell, pages 43-50, 2nd edition published by Interscience Publishers., 1968, or determined according to the ASTM D-1601-78 procedure.

The ultrahigh molecular weight plastics of one or more embodiments of the present invention may be characterized by a $H_f$ that is greater than about 90 J/g, in other embodiments greater than about 95 J/g, in other embodiments greater than 100 J/g, in other embodiments greater than 108 J/g, in other embodiments greater than about 110 J/g, in other embodiments greater than about 112 J/g. The heat of fusion of the ultrahigh molecular weight plastic may be determined by Differential Scanning Calorimetry (DSC).

The ultrahigh molecular weight plastics of one or more embodiments of the present invention may be characterized by a $T_m$ that is greater than about 166° C., in other embodiments greater than about 168° C., and in other embodiments greater than about 170° C. The melting point of the ultrahigh molecular weight plastic may be determined DSC by using a PerkinElmer Instrument, model Pyris 1 DSC. In one or more embodiments, samples weighing approximately 5.5-6.5 mg were sealed in aluminum sample pans and the DSC data were recorded by first heating the samples to 200° C. at a rate of 150° C./minute, called first melt (no data recorded). The samples were kept at 200° C. for 10 minutes before a cooling-heating cycle was applied. The samples were cooled from 200° C. to 25° C. at a rate of 10° C./minute, called crystallization, and then kept at 25° C. for 10 minutes and heated to 200° C. at a rate of 10° C./minute, called second melt. The thermal events in both crystallization and second melt were recorded. The $T_m$ was the peak temperature of the second melting curve and the $T_c$ was the peak temperature of the crystallization peak.

The ultrahigh molecular weight plastics of one or more embodiments of the present invention may be characterized by a $M_w$ that is greater than about $0.8 \times 10^6$ g/mole, in other embodiments greater than about $1.0 \times 10^6$ g/mole, in other embodiments greater than about $1.25 \times 10^6$ g/mole, in other embodiments greater than about $1.5 \times 10^6$ g/mole, in other embodiments greater than about $1.75 \times 10^6$ g/mole, in other embodiments greater than about $2.0 \times 10^6$ g/mole, in other embodiments greater than about $2.25 \times 10^6$ g/mole, in other embodiments greater than about $2.5 \times 10^6$ g/mole, and in other embodiments from about $0.8 \times 10^6$ to about $3.0 \times 10^6$ g/mole.

The ultrahigh molecular weight plastic of one or more embodiments of the present invention may be characterized by a $M_n$ that is greater than about $0.2 \times 10^6$ g/mole, in other embodiments greater than about $0.4 \times 10^6$ g/mole, in other embodiments greater than about $0.6 \times 10^6$ g/mole, in other embodiments greater than about $0.8 \times 10^6$ g/mole, in other embodiments greater than about 0.9 g/mole, and in other embodiments from about $0.3 \times 10^6$ g/mole to about $1.5 \times 10^6$ g/mole. The molecular weight distribution of the composition may be within the narrow range of from about 2.5 to about 7, or in other embodiments less than 6, or in other embodiments less than 5. $M_w$ and $M_n$ of the ultrahigh molecular weight plastic may be determined using GPC as described in U.S. Pat. No. 4,540,753 to Cozewith et al. and references cited therein, and in Verstrate et al, 21 *Macromolecules* 3360 (1998)) or as described below.

In one or more embodiments, $M_w$ and $M_n$ can be determined by using a High Temperature Size Exclusion Chromatograph (GPC PL 220, Polymer Laboratories), equipped with a differential refractive index detector (DRI). Three PLgel Mixed-B columns (Polymer Laboratories) were used. The nominal flow rate was 1.0 cm³/min, and the nominal injection volume was 300 μL. The various transfer lines, columns and the DRI detector were contained in an oven maintained at 160° C. This technique is discussed in "*Macromolecules*, Vol. 34, No. 19, pp. 6812-6820 (2001). Solvent for the GPC analysis was filtered Aldrich reagent grade 1,2, 4-Trichlorobenzene (TCB) containing ~1000 ppm of butylated hydroxy toluene (BHT). The TCB was degassed with an online degasser before entering the SEC. Polymer solutions were prepared by placing dry polymer in a glass container, adding the desired amount of above TCB solvent, then heating the mixture at 160° C. with continuous agitation for about 2 hours. The concentration of ultrahigh molecular weight plastic solution was 0.25 mg/ml. The separation efficiency of the column set was calibrated using a series of narrow MWD polystyrene standards, which reflects the expected $M_w$ range for samples and the exclusion limits of the column set. Eighteen individual polystyrene standards, ranging from Mp ~580 to 10,000,000, were used to generate the calibration curve. The polystyrene standards are obtained from Polymer Laboratories (Amherst, Mass.). A calibration curve (logMp vs. retention volume) is generated by recording the retention volume at the peak in the DRI signal for each PS standard, and fitting this data set to a 2nd-order polynomial. Samples were analyzed using WaveMetrics, Inc. IGOR Pro. The following Mark-Houwink coefficients were used to calculate PP base Mw and PS base MW respectively.

|    | k (dL/g)              | α     |
|----|-----------------------|-------|
| PS | $1.75 \times 10^{-4}$ | 0.67  |
| PP | $2.288 \times 10^{-4}$| 0.705 |

The ultrahigh molecular weight plastics of one or more embodiments of the present invention may be characterized by a MFR at 230° C. and 2.16 kg weight of less than 0.05 dg/min, in other embodiments less than 0.04 dg/min, in other embodiments less than 0.03 dg/min, in other embodiments less than 0.02 dg/min, and in other embodiments 0.01 g/min. In particular embodiments, the MFR of the ultrahigh molecular weight plastics is low enough that the MFR is essentially not measurable. The Melt Flow Rate of the ultrahigh molecular weight plastics may be determined in accordance with ASTM D-1238-04.

The ultrahigh molecular weight plastics of one or more embodiments of the present invention may exhibit stereo defects of less than about 50 per 10,000 carbon atoms, in other embodiments less than about 40, in other embodiments less than about 30, and in other embodiments less than about 20 per 10,000 carbon atoms. In one or more embodiments, the ultrahigh molecular weight plastics can be made to have less than about 10, and in other embodiments less than about 5, stereo defects per 10,000 carbon atoms. Stereo defects may be measured via $^{13}C$ NMR as set forth below:

$^{13}C$ NMR data may be obtained at 100 MHz at 125° C. on a Varian VXR 400 NMR spectrometer. A 90° C. pulse, an acquisition time of 3.0 seconds, and a pulse delay of 20 seconds are employed. The spectra are broad band decoupled and acquired without gated decoupling. Similar relaxation times and nuclear Overhauser effects are expected for the methyl resonances of polypropylenes, which were the only homopolymer resonances used for quantitative purposes. A typical number of transients collected is 2500. The sample is dissolved in tetrachlorethane-$d_2$ at a concentration of 15% by weight. All spectral frequencies are recorded with respect to an internal tetramethylsilane standard. In the case of polypropylene homopolymer, the methyl resonances are recorded with respect to 21.81 ppm for mmmm, which is close to the reported literature value of 21.855 ppm for an internal tetramethylsilane standard. The pentad assignments used are well established.

In one or more embodiments, the ultrahigh molecular weight plastic may also be characterized by a meso pentad fraction of greater than about 96 mol % mmmm pentads.

The ultrahigh molecular weight plastics of one or more embodiments of the present invention may be manufactured by using techniques known in the art for production of olefinic polymers, such as solution polymerization, slurry polymerization or gas phase polymerization techniques, with liquid-phase polymerization being a particular techique. Similarly, the olefin polymers may be produced using any known polyolefin catalyst system, such as Zeigler-Natta catalysts or metallocene catalysts.

Ziegler-Natta-type catalysts are well known in the art, and are discussed, for example, by in *Concise Encyclopedia of Polymer Science and Engineering*, 1087-1107 (Jacqueline I. Kroschwitz ed., 1990) and by F. A. Cotton & G. Wilkinson, *Advanced Inorganic Chemistry*, 1280-1282 (4th ed. 1980). Typical solid magnesium supported catalyst systems and preparations thereof are outlined in U.S. Pat. Nos. 4,990,479 and 5,159,021, and WO 00/44795. For example, Ziegler-Natta catalysts are typically composed of a transition metal compound from groups 4-7 and an organometallic compound of a metal from groups 11-13 of the periodic table. Well-known examples include $TiCl_3$-$Et_2AlCl$, $AlR_3$—$TiCl_4$ wherein Et is an ethyl group and R represents an alkyl group. These catalysts include mixtures of halides of transition metals, especially titanium, chromium, vanadium, and zirconium, with organic derivatives of non-transition metals, particularly alkyl aluminum compounds. The Ziegler-Natta-type catalysts are usually combined with an electron donor. Electron donors may be used in two ways in the formation of a Ziegler-Natta catalyst system. First, an internal electron donor may be used in the formation reaction of the solid catalyst. Examples of internal electron donors include: amines, amides, ethers, esters, aromatic esters, ketones, nitriles, phosphines, stibines, arsines, phosphoramides, thioethers, thioesters, aldehydes, alcoholates, and salts of organic acids. The second use for an electron donor in a catalyst system is as an external electron donor and stereoregulator in the polymerization reaction. The same compound may be used in both instances, although typically they are different. Organic silicon compounds are generally known in the art for use as electron donors. Examples of electron donors that are organic silicon (or "silane") compounds are disclosed in U.S. Pat. Nos. 4,218,339; 4,395,360; 4,328,122; 4,473,660; 6,133,385 and 6,127,303. A description of the two types of electron donors is provided in U.S. Pat. No. 4,535,068.

In some embodiments, the ultrahigh molecular weight plastics of the present invnetion may be manufactured in the liquid-phase with a Zeigler-Natta catalyst comprising $TiCl_4$/MgCl, an internal electron donor comprising di-n-butyl phthalate, an electron donor comprising dicyclopentyldimethoxy silane (DCPMS) and little or no added hydrogen. The method may include the steps of (1) precontacting the Ziegler-Natta catalyst with the DCPMS donor and triethyl aluminum (TEAl), (2) prepolymerizing the catalyst with propylene, (3) further polymerizing the prepolymerized catalyst in one or more reactors, and (4) recovering a polymer composition, which may comprise greater than about 90 mole % propylene monomer. Polymers produced by this method may advantageously have a combination of properties including an intrinsic viscosity greater than about 10 dl/g, a $H_f$ greater than about 108 J/g, a $T_m$ of 165° C. or greater, a $M_w$ greater than about $1.5 \times 10^6$, a molecular weight distribution of from about 2.5 to about 7, a MFR at 230° C. of less than about 0.01 dg/minute, and stereo defects less than about 50 per 10,000 carbon atoms.

In addition to the particular DCPMS donor mentioned above, other acceptable donors may include, without limitation, di(t-butyl)dimethoxysilane, cyclopentyldimethoxy(t-butoxy)silane, (t-butyl)(t-butoxy)dimethoxysilane.

Other Thermoplastic Resins

Where thermoplastic resins in addition to the ultrahigh molecular weight plastics are employed in the manufacture of the thermoplastic vulcanizates of the present invention, the thermoplastic resins may include those that have been employed in the manufacture of thermoplastic vulcanizates as taught in the art. For example, they may include solid, generally high molecular weight plastic resins. Exemplary thermoplastic polymers include crystalline, semi-crystalline, and crystallizable polyolefins, olefin copolymers, and non-olefin resins. The thermoplastic resins may be formed by polymerizing ethylene or α-olefins such as propylene, 1-butene, 1-hexene, 1-octene, 2-methyl-2-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to about 30% by weight of the polymer, for example, See U.S. Pat. No. 6,867,260 B2. Copolymers available under the tradename VISTAMAXX™ (ExxonMobil) are specifically included. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and poly-methacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

In one or more embodiments, the thermoplastic resins include propylene-based polymers including those solid, generally high-molecular weight plastic resins that primarily comprise units deriving from the polymerization of propylene. In certain embodiments, at least 75%, in other embodiments at lease 90%, in other embodiments at least 95%, and in other embodiments at least 97% of the units of the propylene-based polymer derive from the polymerization of propylene. In particular embodiments, these polymers include homopolymers of propylene.

In certain embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or the higher α-olefins, described above, or with $C_{10}$-$C_{20}$ olefins.

In one or more embodiments, propylene-based polymers may include semi-crystalline polymers. In one or more embodiments, these polymers may be characterized by a crystallinity of at least 25% by weight, in other embodiments at least 55% by weight, in other embodiments at least 65%, and in other embodiments at least 70% by weight. Crystallinity may be determined by dividing the heat of fusion of a sample by the heat of fusion of a 100% crystalline polymer, which is assumed to be 209 joules/gram for polypropylene. In one or more embodiments, these polymers may be characterized by a Hf of at least 52.3 J/g, in other embodiments in excess of 100 J/g, in other embodiments in excess of 125 J/g, and in other embodiments in excess of 140 J/g.

In one or more embodiments, useful propylene-based polymers may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by GPC with polystyrene standards.

In one or more embodiments, useful propylene-based polymers can have a MFR (ASTM D-1238, 2.16 kg @ 230° C.) of about 0.2 to 5,000 dg/min, in other embodiments from about 5 to about 500 dg/min, and in other embodiments from about 10 to about 100 dg/min.

In one ore more embodiments, useful propylene-based polymers can have a $T_m$ that is from about 110° C. to about 170° C., in other embodiments from about 140° C. to about 168° C., and in other embodiments from about 160° C. to about 165° C. They may have a $T_g$ of from about −10 to about 10° C, in other embodiments from about −3 to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one embodiment, the propylene-based polymers include a homopolymer of a high-crystallinity isotactic or syndiotactic polypropylene. This polypropylene can have a density of from about 0.89 to about 0.91 g/cc, with the largely isotactic polypropylene having a density of from about 0.90 to about 0.91 g/cc. Also, high and ultrahigh molecular weight polypropylene that has a fractional melt flow rate can be employed. In one or more embodiments, polypropylene resins may be characterized by a MFR (ASTM D-1238; 2.16 kg @ 230° C.) that is less than or equal to 10 dg/min, in other embodiments less than or equal to 1.0 dg/min, and in other embodiments less than or equal to 0.5 dg/min.

Oils/Extenders

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and in other embodiments from about 700 g/mole to about 1,300 g/mole. In one or more embodiments, these oligomers include isobutenyl mer units. Exemplary synthetic oils include polyisobutylene, poly (isobutylene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), and Indopol™ (Innouvene). White synthetic oil is available under the tradename SPECTRASYN™ (ExxonMobil), formerly SHF Fluids (Mobil) and Elevast™ (ExxonMobil). Oils described in U.S. Pat. No. 5,936,028 may also be employed.

In one or more embodiments, the extender oils may include organic esters, alkyl ethers, or combinations thereof including those disclosed in U.S. Pat. Nos. 5,290,866 and 5,397,832, which are incorporated herein by reference. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

Other Constituents

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

Amounts

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, in other embodiments at least about 45 percent by weight, in other embodiments at least about 65 percent by weight, and in other embodiments at least about 75 percent by weight of rubber (i.e., dynamically-vulcanized rubber) based upon the total weight of the thermoplastic vulcanizates. In these or other embodiments, the amount of rubber within the thermoplastic vulcanizates can be from about 15 to about 90 percent by weight, in other embodiments from about 45 to about 85 percent by weight, and in other embodiments from about 60 to about 80 percent by weight, based on the entire weight of the rubber and thermoplastic combined.

In one or more embodiments, the amount of thermoplastic polymer (i.e., uncured polymer within the thermoplastic phase) within the thermoplastic vulcanizates can be from about 10% to about 85% by weight, in other embodiments from about 10% to about 40% by weight, and in other embodiments from about 12% to about 30%, based on the entire weight of the rubber and thermoplastic combined. In these or other embodiments, the amount of thermoplastic polymer within the thermoplastic vulcanizates may be from about 25 to about 250 parts by weight, in other embodiments from about 50 to about 150 parts by weight, and in other embodiments from about 60 to about 100 parts by weight thermoplastic polymer per 100 parts weight rubber.

With respect to the thermoplastic phase, the amount of ultrahigh molecular weight plastic present within the phase may vary in the presence of a complementary thermoplastic resin. In one or more embodiments, at least 40% by weight, in other embodiments at least 50% by weight, in other embodiments at least 75% by weight, in other embodiments at least 85% by weight, in other embodiments at least 90% by weight, and in other embodiments at least 95% by weight of the thermoplastic phase includes the ultrahigh molecular weight plastic. In these or other embodiments, less than 99% by weight, in other embodiments less than 95% by weight, in other embodiments less than 90%, and in other embodiments less than 80% by weight of the thermoplastic phase includes the ultrahigh molecular weight plastic. In particular embodiments, 100% by weight of the thermoplastic phase includes the ultrahigh molecular weight plastic.

Inasmuch as the process of dynamically vulcanizing the rubber with a peroxide curative in the presence of the ultrahigh molecular weight plastic may reduce the ultimate molecular weight of the ultrahigh molecular weight plastic, reference may be made to the amount of ultrahigh molecular weight plastic introduced to the rubber prior to dynamic vulcanization. In one or more embodiments, the amount of ultrahigh molecular weight plastic introduced to the rubber prior to dynamic vulcanization may be at least 20 parts by weight, in other embodiments at least 30 parts by weight, in other embodiments at least 40 parts by weight, in other embodiments at least 50 parts by weight, in other embodiments at least 60 parts by weight, and in other embodiments at least 70 parts by weight ultrahigh molecular weight plastic per 100 parts by weight rubber. In these or other embodiments, the amount of ultrahigh molecular weight plastic introduced to the rubber prior to dynamic vulcanization of the rubber may be less than 200 parts by weight, in other embodiments less than 150 parts by weight, and in other embodiments less 100 parts by weight ultrahigh molecular weight plastic per 100 parts by weight rubber.

Inasmuch as the ultrahigh molecular weight plastic may be added to the thermoplastic vulcanizate after dynamic vulcanization, reference may be made to the amount of ultrahigh molecular weight plastic added after dynamic vulcanization. In one or more embodiments, at least 10 parts by weight, in other embodiments at least 20 parts by weight, in other embodiments at least 30 parts by weight, in other embodiments at least 40 parts by weight, and in other embodiments at least 50 parts by weight ultrahigh molecular weight plastic, per 100 parts by weight rubber, may be introduced to the thermoplastic vulcanizate after dynamic vulcanization. In these or other embodiments, less than 200 parts by weight, in other embodiments less than 150 parts by weight, and in other embodiments less than 100 parts by weight, per 100 parts by weight rubber, may be introduced to the thermoplastic vulcanizate after dynamic vulcanization.

With respect to the oil, the thermoplastic vulcanizate may include from about 25 to about 250 parts by weight, or from about 50 to about 150 parts by weight, or from about 75 to about 130 parts by weight, of extender oil per 100 parts rubber. The quantity of extender oil added may depend upon the properties desired, with the upper limit depending upon the compatibility of the particular oil and blend ingredients; this limit is exceeded when excessive exuding of extender oil occurs. The amount of extender oil may depend, at least in part, upon the type of rubber. High viscosity rubbers are more highly oil extendable.

Preparation

Fillers, such as carbon black, clay, talc, or calcium carbonate may be added in amount from about 1 to about 250 parts by weight, in other embodiments from about 10 to about 150 parts by weight, and in other embodiments from about 25 to about 50 parts by weight, per 100 parts by weight of rubber. The amount of carbon black that can be used may depend, at least in part, upon the type of carbon black and the amount of extender oil that is used.

In preparing the thermoplastic vulcanizates of this invention, the rubber is cured or crosslinked by dynamic vulcanization with a peroxide curative or cure system. Dynamic vulcanization includes a vulcanization or curing process for a rubber within a blend with a thermoplastic resin, where the rubber may be crosslinked or vulcanized under conditions of high shear at a temperature above the melting point of the thermoplastic. In one embodiment, the rubber can be simultaneously crosslinked and dispersed as fine particles within the thermoplastic matrix, although other morphologies may also exist.

In one or more embodiments, dynamic vulcanization can be effected by employing a continuous process. Continuous processes may include those processes where dynamic vulcanization of the rubber is continuously achieved, thermoplastic vulcanizate product is continuously removed or collected from the system, and/or one or more raw materials or ingredients are continuously fed to the system during the time that it may be desirable to produce or manufacture the product.

In one or more embodiments, continuous dynamic vulcanization can be effected within a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruder). Methods and equipment for continuously preparing thermoplastic vulcanizates are described in U.S. Pat. Nos. 4,311,628, 4,594,390, 5,656,693, 6,147,160, and 6,042,260, as well as WO 2004/009327 A1, which are incorporated herein by reference for purpose of U.S. patent practice, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

In one or more embodiments, dynamic vulcanization of the rubber occurs in the presence of the ultrahigh molecular weight plastic. In other words, the rubber and the ultrahigh molecular weight plastic (as well as other ingredients that may be desirable) are mixed and masticated above the melting temperature of the ultrahigh molecular weight plastic, and dynamic vulcanization of the rubber is affected during this mixing period. In particular embodiments, oil is introduced to the mixture. It has advantageously been discovered that the presence of sufficient oil facilitates manufacture of the thermoplastic vulcanizate in the presence of the ultrahigh molecular weight plastic. In certain embodiments, the addition of sufficient oil allows for the achievement of particular advantageous properties of the thermoplastic vulcanizate. In one or more embodiments, at least 75 parts by weight oil, in other embodiments at least 100 parts by weight oil, and in other embodiments at least 150 to 200 parts by weight oil, per 100 parts by weight ultrahigh molecular weight plastic, is present during dynamic vulcanization along with the ultrahigh molecular weight plastic.

In one or more embodiments, the oil may be added together with the ultrahigh molecular weight plastic, in other embodiments prior to introduction of the ultrahigh molecular weight plastic (such as may occur when oil is introduced with the rubber in oil-extended rubber), in other embodiments after introduction of the ultrahigh plastic, or a combination of two or more thereof. In one or more embodiments, the oil may be introduced prior to or together with the ultrahigh molecular weight plastic. In one or more embodiments, introduction of the oil, as well as introduction of the ultrahigh molecular weight plastic, may take place at multiple intervals and/or multiple locations, especially where a continuous process is employed. For example, the oil may be added at multiple barrel locations within a reaction extruder.

In one or more embodiments, the ultrahigh molecular weight plastic may be introduced to the thermoplastic vulcanizate after dynamic vulcanization. Reference to "after dynamic vulcanization" refers to that point in time after the onset of phase inversion between the rubber and plastic (i.e., at that point in time where the plastic becomes a continuous phase within the thermoplastic vulcanizate). As those skilled in the art appreciate, and as may occur in one or more embodiments of the present invention, the initial introduction of rubber and thermoplastic resin forms a blend of mixture where the rubber is the major component (e.g., the rubber may include the major volume fraction of the mixture). In one or more embodiments, the rubber is a continuous phase of the mixture prior to dynamic vulcanization and the thermoplastic resin is a discontinuous phase of the mixture prior to dynamic vulcanization. As noted above, dynamic vulcanization causes a phase inversion where the plastic becomes a continuous phase within the thermoplastic vulcanizate.

In particular embodiments, the introduction of the ultrahigh molecular weight plastic occurs via a downstream feeder within a continuous process whereby the thermoplastic vulcanizate remains within a molten state between dynamic vulcanization and the introduction of the ultrahigh molecular weight plastic. Similar processes are described in International Application No. PCT/US04/30517 (International Publication No. WO 2005/028555), which is incorporated herein by reference for purpose of U.S. patent practice. In particular embodiments, it may be advantageous to introduce additional oil after dynamic vulcanization in order to facilitate manufacture and processing of the thermoplastic vulcanizate when ultrahigh molecular weight plastic is added after dynamic vulcanization. In particular embodiments, certain advantageous thermoplastic properties may be achieved by adding oil with the ultrahigh molecular weight plastic. The oil may be heated to achieve further enhancements in incorporation and final preparation of the thermoplastic vulcanizate.

In other embodiments, the thermoplastic vulcanizate may be cooled below the melt temperature of the thermoplastic resins (e.g., solidified) and fabricated (e.g., pelletized) after dynamic vulcanization and then subsequently introduced to the ultrahigh molecular weight plastic. For example, pellets of the ultrahigh molecular weight plastic and pellets of the thermoplastic vulcanizate may be introduced and melt mixed within a reaction extruder above the melt temperature of the thermoplastic resins. In these embodiments, it may be advantageous to introduce additional oil together with the ultrahigh molecular weight plastic, to facilitate manufacture and processing of the thermoplastic vulcanizate and, in particular embodiments, achieve certain advantageous thermoplastic vulcanizate properties.

In certain embodiments, particularly where the ultrahigh molecular weight plastic is introduced to the thermoplastic vulcanizate after dynamic vulcanization, it may be advantageous to employ mixing techniques that are less aggressive than employed when manufacturing the thermoplastic vulcanizate (i.e., dynamic vulcanization) in order to avoid shear degradation of the ultrahigh molecular weight plastic. For example, twin-screw extruders including less lobes (e.g., 2 instead of 3) may be employed in an effort to avoid or reduce shear degradation.

The cure system employed in preparing the thermoplastic vulcanizates of this invention includes a free-radical cure agent and optionally a coagent. Free-radical cure agents include peroxides such as organic peroxides. Examples of organic peroxides include, but are not limited to, di-tert-butyl peroxide, dicumyl peroxide, t-butylcumyl peroxide, α,α-bis (tert-butylperoxfy) diisopropyl benzene, 2,5-dimethyl-2,5-di (t-butylperoxy)hexane (DBPH), 1,1-di(tert-butylperoxy)-3, 3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Others include azo initiators including Luazo™ AP (ARCHEMA). Useful peroxides and their methods of use in dynamic vulcanization of thermoplastic vulcanizates are disclosed in U.S. Pat. No. 5,656,693, which is incorporated herein by reference for purpose of U.S. patent practice. In certain embodiments, cure systems such as those described in U.S. Pat. No. 6,747,099, U.S. Application Publication No. 20040195550, and WIPO Publication Nos. 2002/28946, 2002/077089, and 2005/092966, may also be employed.

In one or more embodiments, the free-radical cure agent may be employed in conjunction with one or more coagents. Coagents may include high-vinyl polydiene or polydiene copolymer, triallylcyanurate, triallyl isocyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multi-functional acrylates, multi-functional methacrylates, or oximers such as quinone dioxime. Combinations of these coagents may be employed. For example, combinations of high-vinyl polydienes and α-β-ethylenically unsaturated metal carboxylates are useful, as disclosed in U.S. Ser. No. 11/180,235. Coagents may also be employed as neat liquids or together with a carrier. For example, the multi-functional acrylates or multi-functional methacrylates together with a carrier are useful, as disclosed in U.S. Ser. No. 11/246,773. Also, the curative and/or coagent may be premixed with the plastic prior to formulation of the thermoplastic vulcanizate, as described in U.S. Pat. No. 4,087,485.

The skilled artisan will be able to readily determine a sufficient or effective amount of curative and/or coagent to be employed without undue calculation or experimentation. Those skilled in the art appreciate that the amount of curative employed may vary based upon the chemical nature of the peroxide and/or coagent employed. In these or other embodiments, the amount of curative employed may vary based upon the type of rubber employed, as well as the cross-linkable units present within the rubber.

Product Characteristics

For example, where a di-functional peroxide is employed, the peroxide can be employed in an amount less than $3\times10^{-2}$ moles, in other embodiments less than $2\times10^{-2}$ moles, in other embodiments less than $1\times10^{-2}$ moles, in other embodiments less than $0.5\times10^{-2}$ moles, and in other embodiments less than $0.25\times10^{-2}$ moles, of peroxide per 100 parts by weight rubber. Those skilled in the art will be able to readily calculate the number of moles that would be useful for other peroxide based upon this teaching; for example, more peroxide might be useful for monofunctional peroxide compounds, and less peroxide might be useful where peroxides having greater functionality are employed. The amount may also be expressed as a weight per 100 parts by weight rubber. This amount, however, may vary depending on the curative employed. For example, where 2,5-dimethyl-2,5-di(t-butylperoxy)hexane (DBPH) is employed, less than 9 parts, in other embodiments less than 6 parts, in other embodiments less than 3 parts, in other embodiments less than 1.5 parts, in other embodiments less than 0.5 parts, and in other embodiments from about 0.25 to about 1.0 parts by weight peroxide per 100 parts by weight rubber may be employed.

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 µm, optionally less than 30 µm, optionally less than 10 µm, optionally less than 5 µm, and optionally less than 1 µm. In certain embodiments, at least 50%, optionally at least 60%, and optionally at least 75% of the particles have an average diameter of less than 5 µm, optionally less than 2 µm, and optionally less than 1 µm.

In one or more embodiments, the thermoplastic vulcanizates of the present invention are advantageously devoid of residues associated with cure systems other than peroxide or free radical cure systems. For example, the thermoplastic vulcanizates of one or more embodiments of the present invention are devoid of sulfur, hydroscopic compounds, acids, silicon compounds, metals, and/or combinations of two or more of the foregoing.

Use

The thermoplastic elastomers of this invention are useful for making a variety of articles such as weather seals, hoses, belts, gaskets, moldings, boots, elastic fibers and like articles. They are particularly useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

Certain specific embodiments of the invention include:

A thermoplastic vulcanizate comprising a dynamically cured rubber, where the rubber is peroxide cured, and a thermoplastic phase, where at least 10% by weight of the thermoplastic phase includes an ultrahigh molecular weight plastic, where the ultrahigh molecular weight plastic is characterized by a $M_w$ that is greater than $0.8\times10^6$ g/mole.

The embodiment of paragraph 89, where the ultrahigh molecular weight plastic is characterized by a $M_w$ that is greater than $1.0\times10^6$ g/mole.

The embodiments of paragraphs 89-90, where the ultrahigh molecular weight plastic is characterized by a $M_w$ that is greater than $1.25\times10^6$ g/mole.

The embodiments of paragraphs 89-91, where the ultrahigh molecular weight plastic is characterized by an $M_n$ that is greater than $0.2\times10^6$ g/mole.

The embodiments of paragraphs 89-92, where the ultrahigh molecular weight plastic is characterized by a $M_n$ that is greater than $0.4\times10^6$ g/mole.

The embodiments of paragraphs 89-93, where the ultrahigh molecular weight plastic is a propylene-based polymer including greater than about 90 mole % propylene mer units.

The embodiments of paragraphs 89-94, where the ultrahigh molecular weight plastic is characterized by an intrinsic viscosity that is greater than about 11 dl/g as determined according to ASTM D-1601-78.

The embodiments of paragraphs 89-95, where the ultrahigh molecular weight plastic is characterized by an $H_f$ that is greater than 90 J/g as determined by DSC, where the ultrahigh molecular weight plastic is characterized by a $T_m$ that is greater than 166° C. as determined by DSC.

The embodiments of paragraphs 89-96, where the ultrahigh molecular weight plastic is characterized by an MFR at 230° C. and 2.16 kg load of less than 0.05 dg/min as determined according to ASTM D-1238-04.

The embodiments of paragraphs 89-97, where the ultrahigh molecular weight plastic is characterized by an MFR at 230° C. and 2.16 kg load of less than 0.03 dg/min as determined according to ASTM D-1238-04.

The embodiments of paragraphs 89-98, where the ultrahigh molecular weight plastic is characterized by an MFR at 230° C. and 2.16 kg load of less than 0.01 dg/min as determined according to ASTM D-1238-04.

The embodiments of paragraphs 89-99, where the ultrahigh molecular weight plastic is characterized by exhibiting stereo defects of less than about 50 per 10,000 carbon atoms, where the ultrahigh molecular weight plastic is characterized by a meso pentad fraction of greater than about 96 mole pentad.

The embodiments of paragraphs 89-100, where the dynamically cured rubber includes dynamically cured ethylene-propylene rubber, and where the dynamically cured rubber includes dynamically cured propylene-based rubbery copolymer.

A method of making a thermoplastic vulcanizate, the method comprising introducing a rubber and a thermoplastic resin to form a mixture, dynamically vulcanizing the rubber with a peroxide curative in the presence of the thermoplastic resin to form a thermoplastic vulcanizate, where said step of dynamically vulcanizing the rubber causes the thermoplastic resin to become a continuous phase of the thermoplastic vulcanizate, optionally introducing an additional thermoplastic resin to the thermoplastic vulcanizate after said step of dynamically vulcanizing the rubber, where at least one of (i) the thermoplastic resin introduced with the rubber and (ii) the additional thermoplastic resin introduced with the thermoplastic vulcanizate is an ultrahigh molecular weight plastic characterized by an $M_w$ that is greater than $0.8 \times 10^6$ g/mole and an $M_n$ that is greater than $0.2 \times 10^6$ g/mole.

The embodiment of paragraphs 102, where the ultrahigh molecular weight plastic is introduced with the thermoplastic vulcanizate after dynamic vulcanization.

The embodiments of paragraphs 102-103, where the ultrahigh molecular weight plastic is introduced with the rubber to form the mixture, and thereby dynamic vulcanization takes place in the presence of the ultrahigh molecular weight plastic.

The embodiments of paragraphs 102-104, where the thermoplastic vulcanizate remains in a molten state between said step of dynamically vulcanizing and step of introducing the ultrahigh molecular weight plastic.

The embodiments of paragraphs 102-105, where the thermoplastic vulcanizate is solidified and fabricated after said step of dynamically vulcanizing and before said step of introducing the ultrahigh molecular weight plastic.

The embodiments of paragraphs 102-105, where at least 20 parts by weight oil, per 100 parts by weight ultrahigh molecular weight plastic, is introduced prior to or together with the ultrahigh molecular weight plastic.

In order to demonstrate the practice of the present invention, the following examples have been prepared and tested. The examples should not, however, be viewed as limiting the scope of the invention. The claims will serve to define the invention.

EXAMPLES

Thermoplastic vulcanizates were prepared in the following samples by dynamically vulcanizing various elastomeric copolymers in the presence of various thermoplastic resins by using peroxide cure systems. The characteristics of the various elastomeric copolymers are set forth in Table I. The characteristics of the various thermoplastic resins are set forth in Table II.

TABLE I

| | Diene | Weight % Diene | Weight % Ethylene | $M_w$ (kg/mol) | $M_n$ (kg/mol) | Intrinsic Viscosity (dl/g) @ 135° C. | Mooney Viscosity $(ML_{1+4})$ @ 125° C. | Oil Extension (phr) |
|---|---|---|---|---|---|---|---|---|
| EPDM I | 5-vinyl-2-norbornene | 3.0 | 63 | 870 | 63 | 2.2 | 50 | 100 |
| EPDM II | 5-ethylene-2-norbornene | 9.0 | 63 | 504 | 198 | — | 45 | 100 |
| EPDM III | 5-ethylidene-2-norbornene | 4.4 | 66 | ~1,100 | ~200 | 4.8 | 63 | 90 |

TABLE II

| | $M_n$ (×1,000) | $M_w$ (×1,000) | $M_z$ (×1,000) | $M_w/M_n$ | MFR dg/min | DSC $T_{m2}$ | $T_c$ | $\Delta H_{fusion}$ |
|---|---|---|---|---|---|---|---|---|
| PP I | 193 | 995 | 2,578 | 5.17 | 0.17 | 166 | 109 | 91 |
| PP II | 165 | 874 | 2,248 | 5.29 | 0.33 | 166 | 110 | 92 |
| PP III | 247 | 1,056 | 2,479 | 4.28 | 0.10 | 167 | 110 | 93 |
| PP IV | 230 | 1,087 | 2,606 | 4.72 | 0.08 | 167 | 108 | 96 |
| PP V | 226 | 860 | 1,892 | 3.80 | — | 170 | 107 | 92 |
| PP VI | 286 | 1,098 | 2,433 | 3.83 | 0.05 | 168 | 107 | 94 |
| PP VII | 239 | 1,021 | 2,256 | 4.27 | 0.05 | 167 | 111 | 97 |
| PP VIII | 279 | 951 | 2,006 | 3.41 | — | 167 | 110 | 95 |
| PP IX | 449 | 889 | 1,296 | 1.98 | — | 164 | — | 86 |
| PP X | 1,427 | 3,968 | 5,927 | 2.78 | — | 160 | — | 86 |
| PP XI | — | — | — | — | 0.50 | 165 | 120 | 94 |
| PP XII | 115 | 477 | 1,209 | 4.16 | 0.80 | 164 | 110 | 91 |

Molecular weight of the elastomeric copolymers (i.e., EPDM) was determined using a Waters 150 C high temperature GPC instrument. Intrinsic viscosity was measured in Decalin at 135° C. Mooney viscosity (($ML_{1+4}$) @ 125° C.) was determined according to ASTM D-1646 (The rubbers were measured in their oil-extended state). The characteristics of the of the ultrahigh molecular weight plastic, such as molecular weight, were determined as set forth above.

PP XI was purchased under the tradename BE50™ (Borealis). PPXII was purchased under the tradename F008F™ (Sunoco).

PP I-PP VIII was prepared in accordance with the procedures set forth herein above by using a continuous polymerization in a loop slurry pilot plant facility. The unit design included an in-situ prepolymerization facility, two six-inch loop reactors in series, and a granules handling train. Propylene was purified by passing through reduced R3-11 copper catalyst, dehydrated R3-11 copper catalysts, dehydrated 3A molecular sieves, and dehydrated Selexsorb COS alumina columns. A 2 L Zipperclave reactor was purged under a nitrogen flow for 1 hr at 100-120° C. and then the reactor temperature was lowered to room temperature. The catalyst solids were commercial Ziegler-Natta catalysts obtained under the tradenames THC-C-133™ and THC-C-135 (ToHo Catalyst Company). The catalysts were fed via syringe pump to the precontacting vessel, where it was combined with the electron donor-dicyclopentyldimethoxysilane (DCPMS) and triethyl aluminum (TEAl). Typically, 2 mL of 1.0 M triethylaluminum solution in hexanes, 2 mL of 0.1 M dicyclopentyldimethoxysilane solution in hexane and 1,000 mL of propylene were added. Stirring was initiated. Following prepolymerization at 65° F., the prepolymerized catalyst was fed to the main reactors. Specifically, 10 mg of solid catalyst in 5 wt % mineral oil slurry was injected into the reactor by addition of 250 mL of propylene and the reactor was heated to 70° C. in about 5 minutes. After 60 minutes from the catalyst injection, the polymerization was terminated by stopping heating and venting the volatiles. Similar procedures are disclosed in co-pending U.S. Ser. No. 60/881,247, which was filed on Jan. 19, 2007.

PP IX and PP X were prepared by employing metallocene (rac-bis(2-methyl-4-phenylindenyl-zirconiumdimethyl) catalysts together with a $[Ph_3C][B(C_6F_5)_4]$ activator in the case of PP IX and a $[H(C_6F_5)NC_4H_8][B(C_{10}F_7)_4]$ in the case of PP X. The polymerizations were run at 60° C.

Samples 1-9

Nine thermoplastic vulcanizates were prepared within a Brabender mixer under a nitrogen atmosphere. The ingredients included 100 parts by weight of elastomeric copolymer rubber (though the rubber stocks may have been provided with an oil), 56 parts by weight thermoplastic resin, 125 parts by weight paraffinic oil (including any amount provided within the rubber stock), 42 parts by weight clay, 3 parts by weight antioxidant, 6 parts by weight peroxide curative, and 5.6 parts by weight coagent.

The peroxide was 2,5-dimethyl-2,5-di(t-butylperoxy)hexane obtained under the tradename DBPH PAR 100™ (Rhein Chemie); this peroxide was 50% active in paraffinic oil which refers to the fact that the ingredient included 50% by weight of the active peroxide compound and 50% by weight paraffinic oil. The coagent was triallylcyanurate obtained under the tradename PLC(TAC-50BC)™ (Rhein Chemie), which was a powdered liquid concentrate with 50% active agent in an inert mineral carrier. The antioxidant was tetrakis(methylene 3,5-ditert-butyl-4 hydroxy hydrocinnamate)methane obtained under the tradename IRGANOX™ 1010 (Ciba Geigy). The clay was obtained under the tradename ICECAP K™ (Burgess). The oil was a paraffinic oil.

The ingredients employed in making each of the samples and the characteristics of the resulting thermoplastic vulcanizates are set forth in Table III.

TABLE III

| Raw Material | 1 PHR | 2 PHR | 3 PHR | 4 PHR | 5 PHR | 6 PHR | 7 PHR | 8 PHR | 9 PHR |
| --- | --- | --- | --- | --- | --- | --- | --- | --- | --- |
| EPDM I | 200 | — | — | 200 | — | — | 200 | — | — |
| EPDM II | — | 200 | — | — | 200 | — | — | 200 | — |
| EPDM III | — | — | 190 | — | — | 190 | — | — | 190 |
| PP XII | 56 | 56 | 56 | — | — | — | — | — | — |
| PP IX | — | — | — | 56 | 56 | 56 | — | — | — |
| PP X | — | — | — | — | — | — | 56 | 56 | 56 |
| Additive Oil | 25.0 | 25.0 | 35.0 | 25.0 | 25.0 | 35.0 | 25.0 | 25.0 | 35.0 |
| Clay | 42 | 42 | 42 | 42 | 42 | 42 | 42 | 42 | 42 |
| Coagent | 5.6 | 5.6 | 5.6 | 5.6 | 5.6 | 5.6 | 5.6 | 5.6 | 5.6 |
| Peroxide | 6 | 6 | 6 | 6 | 6 | 6 | 6 | 6 | 6 |
| Antioxidant | 3 | 3 | 3 | 3 | 3 | 3 | 3 | 3 | 3 |
| Shore: ISO, A | 68 | 72 | 74 | 70 | 70 | 72 | 70 | 69 | 72 |
| Shore; leverload A | 65 | 69 | 73 | 69 | 68 | 69 | 66 | 65 | 68 |
| Tensile Strength (MPa) | 6.67 | 6.59 | 6.49 | 7.21 | 7.60 | 8.241 | 7.40 | 6.97 | 9.16 |
| Elongation @ Break (%) | 269 | 334 | 365 | 299 | 380 | 459 | 297 | 375 | 471 |
| Stress @ 100% Strain (MPa) | 3.59 | 3.57 | 3.70 | 3.59 | 3.30 | 3.51 | 3.80 | 3.04 | 3.69 |
| Tension Set (%) | 9 | 10 | 11 | 11 | 12 | 13 | 11.5 | 11.5 | 11 |
| Compression Set (%) | 30 | 31 | 36 | 30 | 31 | 35 | 32 | 29 | 35 |
| LCR Viscosity, Pa s @ 204° C.) 1200 (1/s) | 88 | 76 | 87 | 94 | 91 | 101 | 94 | 96 | 107 |
| Die Swell (%) | 7...11 | 1...6 | 0...7 | 3...8 | 5...9 | 9...14 | 5...9 | 9...13 | 8...12 |
| Weight Gain (%) | 87 | 83 | 95 | 86 | 88 | 93 | 86 | 93 | 96 |

The data obtained and set forth in Table III evidences that technologically useful thermoplastic vulcanizates can be prepared by employing ultrahigh molecular weight plastics. Also, a particularly advantageous balance of properties can be obtained where ultrahigh molecular weight plastics, particularly those with a $M_w$ above $1.0 \times 10^6$ g/mole are employed. A property particularly worth noting is the advantageous melt strength, which is evidenced by the LCR viscosity.

Shore hardness was determined according to ISO 868 and ASTM D-2240. Ultimate tensile strength, ultimate elongation, and 100% modulus were determined according to ASTM D-412 at 23°C by using an Instron testing machine. Weight gain was determined according to ASTM D-471 after 24 hours at 121° C. Tension set was determined according to ASTM D-412. Compression set was determined at 25% compression after exposure to 100° C. for 72 hours according to ASTM D-395 Method B. LCR capillary viscosity was determined with a Dynisco™ Capillary Rheometer at 30:1 L/D at 1200 s⁻¹. Die swell was determined by a laser device.

Samples 10-19

Ten additional thermoplastic vulcanizates were prepared by employing a 3-lobe, 53 mm twin-screw extruder and employing conventional techniques preparation of thermoplastic vulcanizates within large-scale mixing equipment. The ingredients included 100 parts by weight of elastomeric copolymer (though the stocks may have been provided with an oil), 26 parts by weight thermoplastic resin, 134 parts by weight paraffinic oil (including any amount provided within the rubber stock), 42 parts by weight clay, 1.8 parts by weight antioxidant, 3.25 parts by weight peroxide curative, 1.38 parts by weight acid scavenger, 1.94 parts by weight zinc oxide, 3.25 parts by weight peroxide, and 4.05 parts by weight coagent, which was a coagent-wetted carrier.

The peroxide was 2,5-dimethyl-2,5-di(t-butylperoxy)hexane obtained under the tradename DHBP50-WO™ (Degussa); this peroxide was 50% active in paraffinic oil which refers to the fact that the ingredient included 50% by weight of the active peroxide compound and 50% by weight paraffinic oil. The acid scavenger was obtained under the tradename DHT-4 (Kyowa), which was a hydrotalcite. The antioxidant included a 50/50 blend of IRGANOX™ 1035 and ULTRANOX™ 636 (Ciba Geigy). The clay was obtained under the tradename ICECAP K™ (Burgess). The oil was a paraffinic oil. The coagent-wetted carrier was obtained under the tradename FLOWSPERSE™ FPC (SR 350)-50 (Flow Polymer, Inc), which was trimethylolpropane trimethacrylate on silicon dioxide at 50 weight percent.

The characteristics of the resulting thermoplastic vulcanizates are set forth in Table IV. The compression set (as set forth in Tables IV and V) was determined after 1 week at 100° C. per ASTM D-395 Method B.

To each of the foregoing thermoplastic vulcanizates was added an additional 33 parts by weight, per 100 parts by weight rubber, of the same plastic employed in each of the respective samples. Specifically, pellets of the thermoplastic vulcanizate were introduced into a two-lobe twin-screw extruder together with pellets of the thermoplastic resin and the ingredients where melt mixed within the twin-screw extruder above the melt temperature of the thermoplastics resins. These thermoplastic vulcanizates, which were harder due to the presence of additional thermoplastic resin, were analyzed and the results are likewise set forth in Table IV under the section labeled "After addition of 33 phr Plastic." Again the plastic added to each thermoplastic vulcanizate was the same plastic employed in preparing the thermoplastic vulcanizate.

TABLE IV

|  | 10 | 11 | 12 | 13 | 14 | 15 | 16 | 17 | 18 | 19 |
|---|---|---|---|---|---|---|---|---|---|---|
| PP I | 0 | 26 | 0 | 0 | 0 | 0 | 0 | 0 | 0 | 0 |
| PP II | 0 | 0 | 26 | 0 | 0 | 0 | 0 | 0 | 0 | 0 |
| PP III | 0 | 0 | 0 | 26 | 0 | 0 | 0 | 0 | 0 | 0 |
| PP IV | 0 | 0 | 0 | 0 | 26 | 0 | 0 | 0 | 0 | 0 |
| PP V | 0 | 0 | 0 | 0 | 0 | 26 | 0 | 0 | 0 | 0 |
| PP VI | 0 | 0 | 0 | 0 | 0 | 0 | 26 | 0 | 0 | 0 |
| PP VII | 0 | 0 | 0 | 0 | 0 | 0 | 0 | 26 | 0 | 0 |
| PP VIII | 0 | 0 | 0 | 0 | 0 | 0 | 0 | 0 | 26 | 0 |
| PP XI | 0 | 0 | 0 | 0 | 0 | 0 | 0 | 0 | 0 | 26 |
| PP XII | 26 | 0 | 0 | 0 | 0 | 0 | 0 | 0 | 0 | 0 |
| ISO Hardness (Shore A) | 46 | 48 | 48 | 49 | 48 | 48 | 49 | 48 | 53 | 51 |
| Specific Gravity | 0.991 | 0.983 | 0.982 | 0.979 | 0.979 | 0.979 | 0.981 | 0.985 | 1.048 | 1.041 |
| UTS (MPa) | 3.11 | 3.55 | 3.68 | 3.73 | 3.60 | 3.57 | 3.76 | 3.91 | 4.26 | 4.34 |
| UE (%) | 250 | 264 | 272 | 273 | 254 | 277 | 291 | 259 | 273 | 315 |
| M100 (MPa) | 1.38 | 1.41 | 1.40 | 1.42 | 1.41 | 1.37 | 1.36 | 1.35 | 1.68 | 1.62 |
| Weight Gain % | 107.7 | 99.6 | 100.5 | 98.5 | 98.8 | 105.9 | 103.3 | 104.0 | 90.4 | 94.9 |
| LCR (1200 1/s) | 83.9 | 77.6 | 76.9 | 75.1 | 76.0 | 78.1 | 77.5 | 78.0 | 75.8 | 77.5 |
| ESR median | 213 | 236 | 266 | 218 | 246 | 250 | 275 | 291 | 208 | 169 |
| Tension Set (%) | 5.0 | 5.0 | 5.0 | 5.0 | 5.0 | 5.5 | 5.5 | 5.5 | 6.5 | 6.0 |
| Compression Set (%) | 22 | 19 | 22 | 20 | 19 | 21 | 21 | 23 | 24 | 22 |
| After addition of 33 phr Plastic |  |  |  |  |  |  |  |  |  |  |
| ISO Hardness (Shore A) | 72 | 76 | 71 | 74 | 77 | 74 | 78 | 80 | 82 | 74 |
| Specific Gravity | 0.979 | 0.968 | 0.970 | 0.974 | 0.975 | 0.965 | 0.973 | 0.973 | 0.999 | 1.027 |
| UTS (MPa) | 6.80 | 7.74 | 6.60 | 4.00 | 8.30 | 9.09 | 8.20 | 8.80 | 9.35 | 7.32 |
| UE (%) | 454 | 434 | 420 | 402 | 423 | 386 | 448 | 456 | 466 | 438 |
| M100 (MPa) | 2.58 | 3.26 | 2.65 | 3.25 | 3.71 | 3.19 | 3.85 | 4.73 | 4.80 | 2.99 |
| Weight Gain % | 92.9113 | 74.4 | 103.1 | 83.0 | 77.4 | 89.6 | 81.4 | 81.1 | 70.7 | 82.9 |
| LCR (1200 1/s) | 80.6 | 94.9 | 89.9 | 98.0 | 100.0 | 93.5 | 108.3 | 110.5 | 111.1 | 87.9 |
| ESR median | 158 | 211 | 162 | 176 | 188 | 166 | 206 | 199 | 166 | 122 |
| Tension Set (%) | 37 | 14.0 | 11.0 | 12.0 | 14.0 | 11.0 | 16.0 | 16.0 | 17.0 | 13.0 |
| Compression Set (%) 168 h at 100° C. | 35 | 42 | 40 | 41 | 41 | 38 | 44 | 43 | 42 | 41 |

The data obtained and set forth in Table IV evidences that technologically useful thermoplastic vulcanizates can be prepared using ultrahigh molecular weight plastics and that additional advantages can be achieved by introducing some of the ultrahigh molecular weight after dynamic vulcanization. Also, the ultrahigh molecular weight polypropylene result in higher hardness thermoplastic vulcanizates. This is presumed to be due to their higher viscosity because of the much higher molecular weight. Thus, it is also possible to add more oil to the thermoplastic vulcanizates to reduce their hardness to the same level as the comparative example with lower MW polypropylene PP XII. In turn, this opens the way to further enhanced properties and improved economics.

Samples 20-29

The thermoplastic vulcanizate prepared in Sample 10 above (prior to the addition of the additional thermoplastic resin as set forth above) was fractioned into 10 additional samples. To each of these samples was added 33 parts by weight, per 100 parts by weight rubber, of an additional thermoplastic resin as set forth in Table V. Specifically, the thermoplastic vulcanizate prepared in Sample 10 above was pelletized, and pellets of this thermoplastic vulcanizate were introduced into a two-lobe, twin extruder with pellets of the additional thermoplastic resin, and these ingredients were melt mixed within the twin-screw extruder above the melt temperature of the thermoplastic resin.

After addition of the additional plastic, the resulting thermoplastic vulcanizates were tested for various properties as set forth in Table V.

TABLE V

| | Sample | | | | | | | | | |
|---|---|---|---|---|---|---|---|---|---|---|
| | 20 | 21 | 22 | 23 | 24 | 25 | 26 | 27 | 28 | 29 |
| PP I | 0 | 33 | 0 | 0 | 0 | 0 | 0 | 0 | 0 | 0 |
| PP II | 0 | 0 | 33 | 0 | 0 | 0 | 0 | 0 | 0 | 0 |
| PP III | 0 | 0 | 0 | 33 | 0 | 0 | 0 | 0 | 0 | 0 |
| PP IV | 0 | 0 | 0 | 0 | 33 | 0 | 0 | 0 | 0 | 0 |
| PP V | 0 | 0 | 0 | 0 | 0 | 33 | 0 | 0 | 0 | 0 |
| PP VI | 0 | 0 | 0 | 0 | 0 | 0 | 33 | 0 | 0 | 0 |
| PP VII | 0 | 0 | 0 | 0 | 0 | 0 | 0 | 33 | 0 | 0 |
| PP VIII | 0 | 0 | 0 | 0 | 0 | 0 | 0 | 0 | 33 | 0 |
| PP XI | 0 | 0 | 0 | 0 | 0 | 0 | 0 | 0 | 0 | 33 |
| PP XII | 33 | 0 | 0 | 0 | 0 | 0 | 0 | 0 | 0 | 0 |
| ISO Hardness (Shore A) | 72 | 77 | 70 | 77 | 74 | 74 | 78 | 79 | 82 | 74 |
| Specific Gravity | 0.979 | 0.981 | 0.981 | 0.980 | 0.974 | 0.979 | 0.978 | 0.974 | 0.971 | 0.967 |
| UTS (MPa) | 6.80 | 7.11 | 6.78 | 7.45 | 6.98 | 6.68 | 7.27 | 7.78 | 8.38 | 7.92 |
| UE (%) | 454 | 411 | 434 | 418 | 408 | 400 | 392 | 403 | 437 | 486 |
| M100 (MPa) | 2.58 | 3.37 | 2.56 | 3.63 | 3.33 | 3.06 | 4.06 | 4.21 | 4.37 | 2.86 |
| Weight Gain % | 93 | 88 | 97 | 83 | 92 | 94 | 87 | 83 | 79 | 95 |
| LCR (1200 1/s) | 81 | 97 | 90 | 103 | 101 | 96 | 106 | 108 | 108 | 87 |
| ESR | 158 | 110 | 135 | 121 | 122 | 113 | 109 | 113 | 122 | 146 |
| Tension Set (%) | 37 | 12 | 10 | 13 | 10 | 11 | 12 | 15 | 16 | 13 |
| Compression Set (%) | 35 | 40 | 43 | 36 | 40 | 39 | 38 | 35 | 43 | 39 |

The data obtained and set forth in Table V evidences that technologically useful thermoplastic vulcanizates with differentiated characteristics relative to conventional thermoplastic vulcanizates cured with peroxides can be prepared by introducing ultrahigh molecular weight plastics to otherwise conventional, relatively soft thermoplastic vulcanizates.

Various modifications and alterations that do not depart from the scope and spirit of this invention will become apparent to those skilled in the art. This invention is not to be duly limited to the illustrative embodiments set forth herein.

What is claimed is:

1. A thermoplastic vulcanizate comprising:
a dynamically cured rubber, where the rubber is fully cured by a peroxide; and
a thermoplastic phase, where 100% by weight of the thermoplastic phase includes an ultrahigh molecular weight plastic, where the ultrahigh molecular weight plastic is a propylene-based polymer including greater than 90 mole percent propylene mer units and is characterized by a weight average molecular weight ($M_w$) that is from $3.0 \times 10^6$ to $3,968 \times 10^6$ g/mole, a molecular weight distribution (Mw/Mn) of from 2.5 to less than 5, stereo defects of less than 50 per 10,000 carbon atoms, and a meso pentad fraction of greater than 96 mole % mmmm pentads,
wherein the rubber is dynamically cured in the presence of the ultrahigh molecular weight plastic.

2. The thermoplastic vulcanizate of claim 1, where the ultrahigh molecular weight plastic is characterized by a number average molecular weight ($M_n$) that is greater than $0.4 \times 10^6$ g/mole.

3. The thermoplastic vulcanizate of claim 1, where the ultrahigh molecular weight plastic is characterized by a number average molecular weight ($M_n$) that is greater than $0.9 \times 10^6$ g/mole.

4. The thermoplastic vulcanizate of claim 1, where the ultrahigh molecular weight plastic is characterized by an intrinsic viscosity that is greater than about 11 dl/g as determined according to ASTM D-1601-78.

5. The thermoplastic vulcanizate of claim 1, where the ultrahigh molecular weight plastic is characterized by a heat of fusion ($H_f$) that is at least 86 J/g as determined by DSC, where the ultrahigh molecular weight plastic is characterized by a melting temperature ($T_m$) that is at least 160° C. as determined by DSC.

6. The thermoplastic vulcanizate of claim 1, where the ultrahigh molecular weight plastic is characterized by an MFR at 230° C. and 2.16 kg load of less than 0.05 dg/min as determined according to ASTM D-1238-04.

7. The thermoplastic vulcanizate of claim 4, where the ultrahigh molecular weight plastic is characterized by an MFR at 230° C. and 2.16 kg load of less than 0.03 dg/min as determined according to ASTM D-1238-04.

8. The thermoplastic vulcanizate of claim 5, where the ultrahigh molecular weight plastic is characterized by an MFR at 230° C. and 2.16 kg load of less than 0.01 dg/min as determined according to ASTM D-1238-04.

9. The thermoplastic vulcanizate of claim 1, where the dynamically cured rubber includes dynamically cured ethylene-propylene rubber and dynamically cured propylene-based rubbery copolymer.

10. A thermoplastic vulcanizate prepared by a process comprising:
  dynamically vulcanizing a rubber with a peroxide curative in the presence of a thermoplastic resin included 100% of an ultrahigh molecular weight plastic, based on the weight of the thermoplastic resin, where the ultrahigh molecular weight plastic is a propylene-based polymer characterized by a weight average molecular weight ($M_w$) that is from $3.0 \times 10^6$ to $3,968 \times 10^6$ g/mole and a number average molecular weight ($M_n$) that is greater than $0.2 \times 10^6$ g/mole, a molecular weight distribution (Mw/Mn) of from 2.5 to less than 5, stereo defects of less than 50 per 10,000 carbon atoms, a meso pentad fraction of greater than 96 mole % mmmm pentads, and including greater than 90 mole percent propylene mer units, where said step of dynamically vulcanizing the rubber causes the thermoplastic resin to become a contiuous phase of the thermoplastic vulcanizate; and
  to thereby produce the thermoplastic vulcanizate including (a) the dynamically cured rubber, where the rubber is fully cured by the peroxide, and (b) the thermoplastic phase, where 100% by weight of the thermoplastic phase includes the ultrahigh molecular weight plastic, where the ultrahigh molecular weight plastic is the propylene-based polymer including greater than 90 mole percent propylene mer units characterized by a $M_w$ that is from $3.0 \times 10^6$ to $3,968 \times 10^6$ g/mole an $M_n$ that is greater than $0.2 \times 10^6$ g/mole, and a molecular weight distribution (Mw/Mn) of from 2.5 to less than 5, stereo defects of less than 50 per 10,000 carbon atoms, and a meso pentad fraction of greater than 96 mole % mmmm pentads.

* * * * *